US012754074B2

(12) United States Patent
Khendad et al.

(10) Patent No.: US 12,754,074 B2
(45) Date of Patent: Oct. 6, 2026

(54) INFRARED SENSOR MOUNTING SYSTEM FOR LOW-VOLTAGE SWITCHGEAR

(71) Applicant: Eaton Intelligent Power Limited, Dublin (IE)

(72) Inventors: Amit Ashok Khendad, Pune (IN); Daniel Edward Hrncir, Jr., Arden, NC (US); David Aaron Metcalf, Black Mountain, NC (US)

(73) Assignee: Eaton Intelligent Power Limited, Dublin (IE)

( * ) Notice: Subject to any disclaimer, the term of this patent is extended or adjusted under 35 U.S.C. 154(b) by 232 days.

(21) Appl. No.: 18/502,428

(22) Filed: Nov. 6, 2023

(65) Prior Publication Data

US 2024/0151587 A1 May 9, 2024

(30) Foreign Application Priority Data

Nov. 8, 2022 (IN) ............................. 202211063565

(51) Int. Cl.
*G01J 5/02* (2022.01)

(52) U.S. Cl.
CPC .................................. *G01J 5/0205* (2013.01)

(58) Field of Classification Search
None
See application file for complete search history.

(56) References Cited

U.S. PATENT DOCUMENTS

2009/0206264 A1* 8/2009 Twiney ................ G01J 5/0853 250/353
2016/0233650 A1* 8/2016 Baillargeon ........... H02B 1/056

* cited by examiner

*Primary Examiner* — Erica S Lin
(74) *Attorney, Agent, or Firm* — Stanek Lemon Crouse & Meeks, PA

(57) ABSTRACT

A sensor mounting system is provided including a non-conductive bracket having a first end portion and a second end portion; a busbar section connected to the first end portion of the non-conductive bracket and having a high emissivity coating on a surface thereof; and an infrared sensor connected to the second end portion the non-conductive bracket, such that the infrared sensor faces the surface of the bus bar having the high emissivity coating and is spaced apart from the busbar section a predetermined distance.

15 Claims, 4 Drawing Sheets

INFRARED SENSOR MOUNTING SYSTEM FOR LOW-VOLTAGE SWITCHGEAR

CLAIM OF PRIORITY

The present application claims the benefit of and priority to Indian Provisional Application No. 202211063565, filed on Nov. 8, 2022, entitled UNIQUE INFRARED SENSOR MOUNTING DESIGN FOR LOW-VOLTAGE SWITCHGEAR, the contents of which are hereby incorporated herein by reference as if set forth in its entirety.

BACKGROUND

Installation of infrared sensors on low-voltage switchgear generally requires a lot steps to meet specific requirements. For example, the measuring surface must have a black coating for maximum emissivity and the distance from the sensor to the measuring surface must be maintained to achieve accuracy of the sensor. Generally, the approach used to achieve this installation requirement can lead to required product updates and complexity due to the wide range of design offerings from the low-voltage division. Introduction of an additional painting process to provide the black coating and multiple locations for sensor bracket installation introduce further complexity. Improvements are desired.

SUMMARY

Some embodiments of the present inventive concept provide sensor mounting system. The system includes a non-conductive bracket having a first end portion and a second end portion; a busbar section connected to the first end portion of the non-conductive bracket and having a high emissivity coating on a surface thereof; and an infrared sensor connected to the second end portion the non-conductive bracket, such that the infrared sensor faces the surface of the bus bar having the high emissivity coating and is spaced apart from the busbar section a predetermined distance.

In further embodiments, the non-conductive bracket is a "Z" shape. The non-conductive "Z" shaped bracket may include a lip that prevents rotation of the bracket relative to the busbar section.

In still further embodiments, high emissivity coating may be a black coating.

In some embodiments, the busbar section may be connected to the first end portion of the non-conductive bracket by a bolt.

In further embodiments, the busbar section may be mounted to a runback of a low voltage switchgear.

In still further embodiments, the busbar section may include one of copper or other electrically conductive material.

In some embodiments, an infrared projection from the infrared sensor may extend downward from the second end portion of the non-conductive bracket.

Further embodiments of the present inventive concept provide a mounting system including "Z" shaped non-conductive bracket having a first end portion and a second end portion; and a busbar section connected to the first end portion of the "Z" shaped non-conductive bracket and having a high emissivity coating on a surface thereof, wherein the second end portion of the "Z" shaped non-conductive bracket is configured to receive an infrared sensor at the second end portion the "Z" shaped non-conductive bracket, such that the infrared sensor faces the surface of the bus bar having the high emissivity coating and is spaced apart from the busbar section a predetermined distance.

DETAILED DESCRIPTION OF EMBODIMENTS

Figure 1:
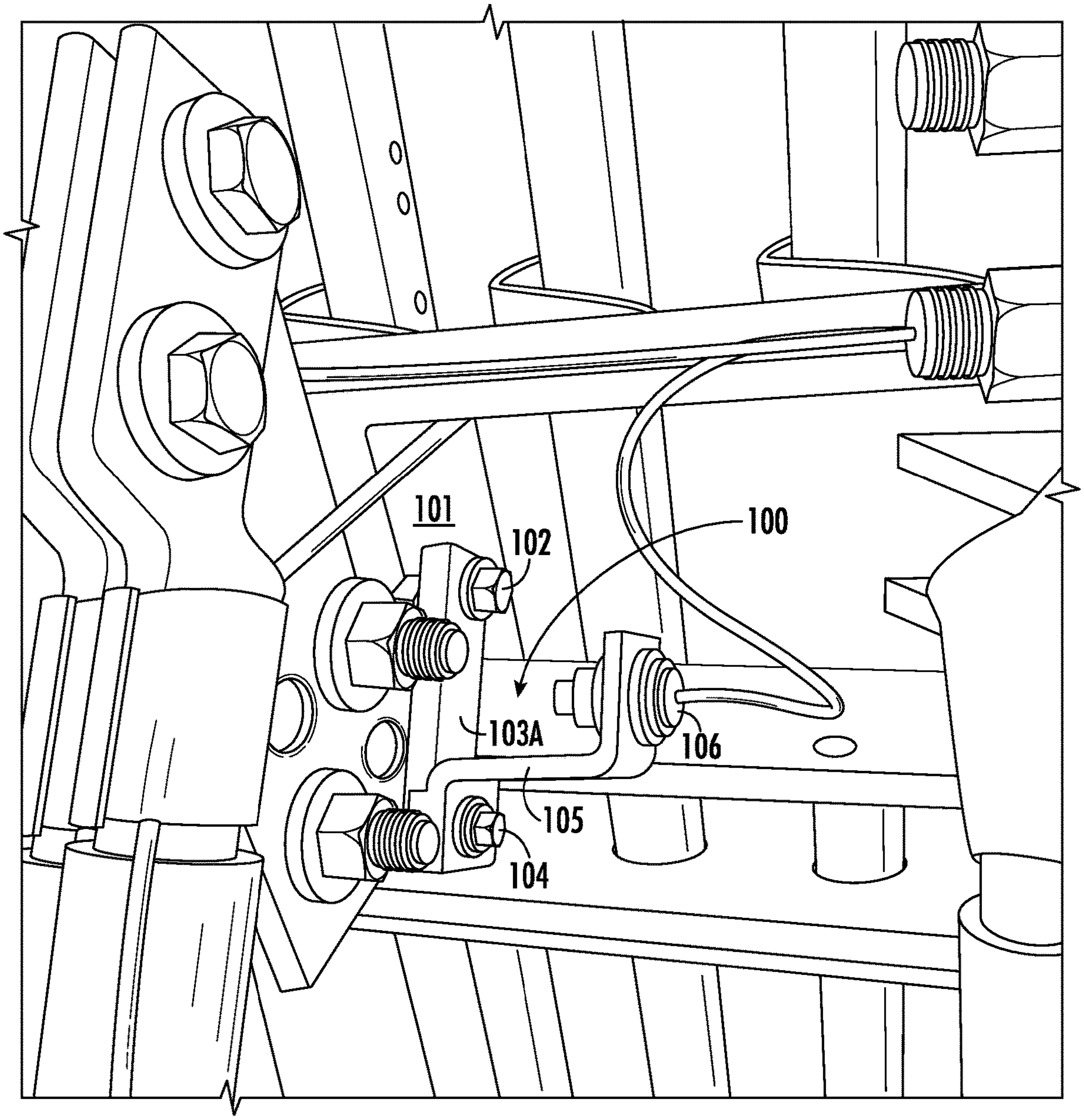
FIG. 1 is a diagram of the infrared sensor mounting system in accordance with some embodiments of the present inventive concept.

The inventive concept now will be described more fully hereinafter with reference to the accompanying drawings, in which illustrative embodiments of the inventive concept are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. Like numbers refer to like elements throughout. As used herein, the term "and/or" includes any and all combinations of one or more of the associated listed items. Similarly, as used herein, the word "or" is intended to cover inclusive and exclusive OR conditions. In other words, A or B or C includes any or all of the following alternative combinations as appropriate for a particular usage: A alone; B alone: C alone; A and B only; A and C only; B and C only; and A and B and C.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Reference will now be made in detail to various and alternative example embodiments and to the accompanying figures. Each example embodiment is provided by way of explanation, and not as a limitation. It will be apparent to those skilled in the art that modifications and variations can be made without departing from the scope or spirit of the disclosure and claims. For instance, features illustrated or described as part of one embodiment may be used in connection with another embodiment to yield a still further embodiment. Thus, it is intended that the present disclosure includes modifications and variations that come within the scope of the appended claims and their equivalents.

As used herein, a low-voltage switchgear refers to a power distribution product designed to safely, efficiently and reliably supply electric power at voltages up to 1,000 volts and current up to 6,000 amps.

As discussed above, installation of infrared sensors on low-voltage switchgear can be time consuming due to the specific requirements required for installation. Accordingly, some embodiments of the present inventive concept provide a unique sensor mounting system, which may not require any changes to the existing product at a customer connection 101 as shown in FIG. 1.

As illustrated in FIG. 1, in some embodiment, the sensor mounting system 100 includes a busbar section 103 mounted to a portion of an existing product with a bolt 102. For example, the busbar section 103 could be mounted to a portion of the existing bus bar such as a runback of a low voltage switchgear. "Runbacks" generally run horizontally back from a load side of each feeder breaker, through the bus compartment (without connecting to the vertical or main bus) and into the cable compartment to provide lug landings for terminating load cables.

The busbar section 103 may include, for example, copper or another electrically conductive material without departing from the scope of the present inventive concept. In accordance with embodiments discussed herein, a high emissivity coating, such as a black coating, is provided on at least one surface (A in FIG. 1) of the busbar section 103. For example, in some embodiments, a high-emissivity spray-on coating can be applied to metal and ceramic surfaces that are exposed to high temperatures in production/service, which may result in improved heat transfer, processing conditions and throughput as will be discussed further herein.

Emissivity is defined as the ratio of the energy radiated from a material's surface to that radiated from a perfect emitter, known as a blackbody, at the same temperature and wavelength and under the same viewing conditions. It is a dimensionless number between 0 (for a perfect reflector) and 1 (for a perfect emitter).

Referring again to FIG. 3, the busbar section 103 made of, for example, copper, has a similar temperature as that of the portion of the existing busbar (runback), as it has a surface that is in contact with the runback. Furthermore, the busbar section 103 has an excellent ability to conduct as well as radiate heat due to the high-emissivity coating applied thereto.

Figure 2:
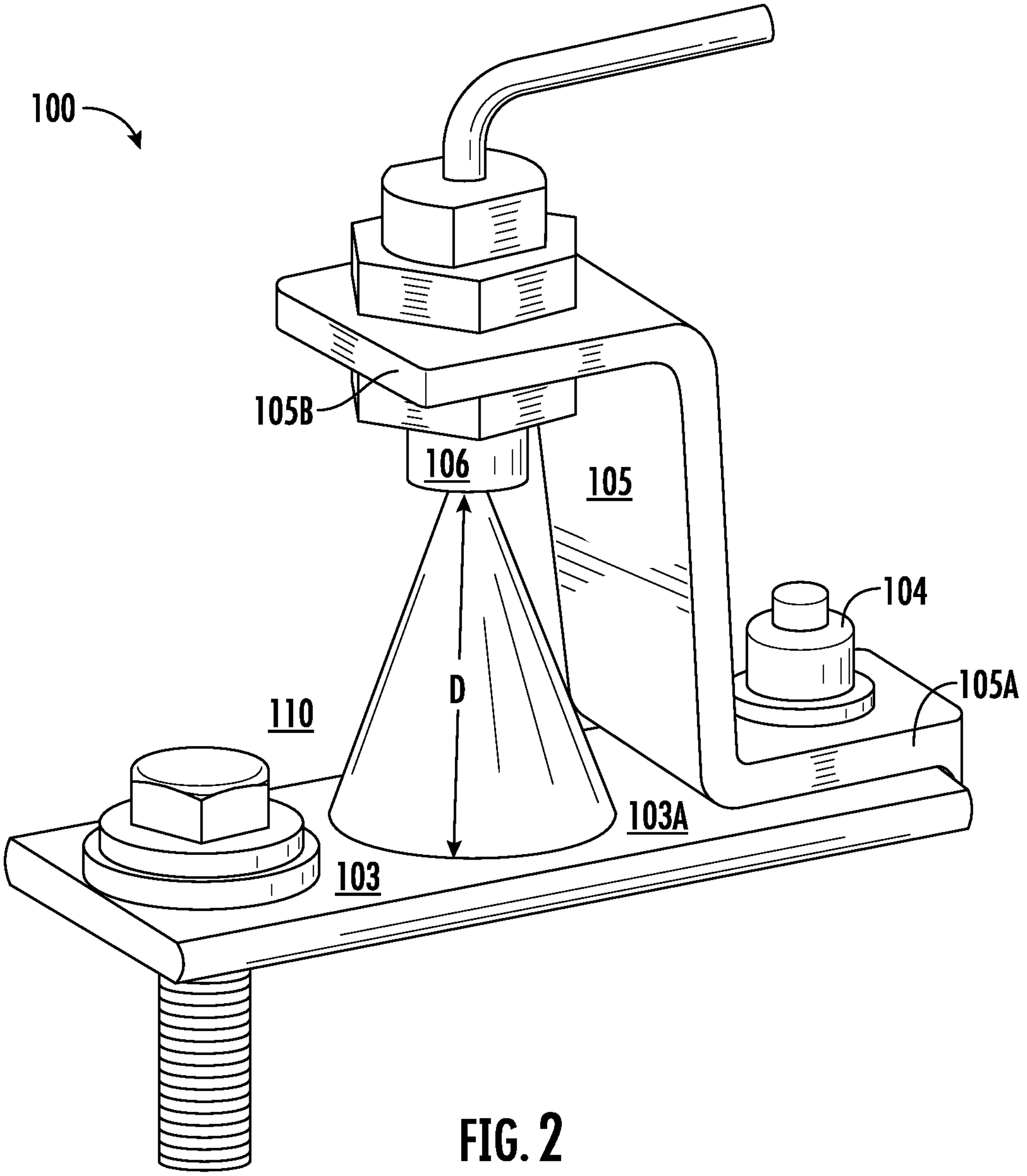
FIG. 2 is a diagram illustrating a bracket in accordance with some embodiments of the present inventive concept.
Figure 3:
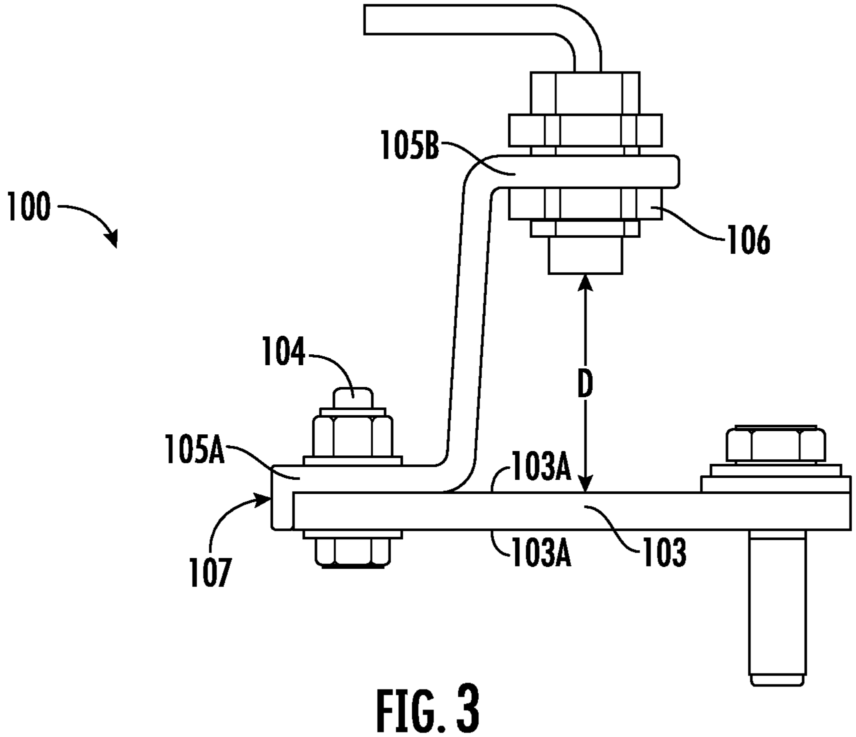
FIG. 3 is a diagram illustrating a side view of the system including the bracket in accordance with some embodiments of the present inventive concept.

As shown in FIGS. 1-3, the system 100 also includes a non-conductive material "Z" shaped-bracket 105, having a first end portion 105A coupled to one end of the busbar section 103 with a bolt 104 and a second end portion 105B configured to hold an infrared sensor 106. The bracket 105 is coupled to the busbar section 103 and the infrared sensor 106 is coupled to the bracket 105, such that the sensor 106 faces the surface 103A of the busbar section 103 having the high emissivity coating and the infrared sensor 106 is spaced apart from the surface (103A) of the busbar section 103 at a distance D. In some embodiments, the first end portion 105A of the "Z" shaped bracket 105 may include a lip 107 that reduces the likelihood, or possibly prevents, rotation of the bracket 105 relative to the busbar section 103. The mounting system 100 in accordance with some embodiments of the present inventive concept may be a differentiator compared to conventional practices used in the market and may provide an added edge by providing a unique, standard and robust solution.

It will be understood that embodiments of the present inventive concept may be implemented without changes in existing designs and processes. The standard design is applicable for low-voltage assembly variants and has a uniform infrared sensor correction factor. Embodiments of the present inventive concept may achieve UL1558 clearance and creepage requirements and may be easy to install.

Referring specifically to FIG. 2, as illustrated, the infrared projection 110 from the sensor 106 extends downward from the second portion 105B of the "Z" shaped bracket 105 and is kept a predetermined distance D away from the surface 103A of the busbar section 103 having the high emissivity coating.

Figure 4:
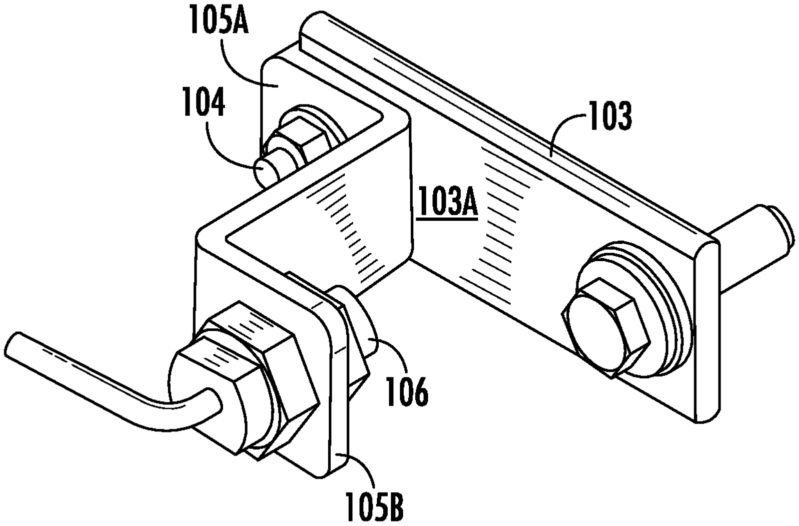
FIG. 4 is a diagram illustrating an iso view of the system including the bracket in accordance with some embodiments of the present inventive concept.
Figure 5C:
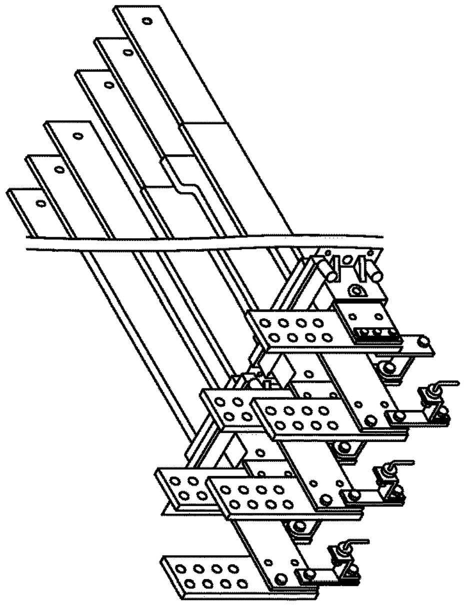
FIGS. 5A through 5C are diagrams illustrating supporting assembly drawings in accordance with some embodiments of the present inventive concept.
Figure 5B:
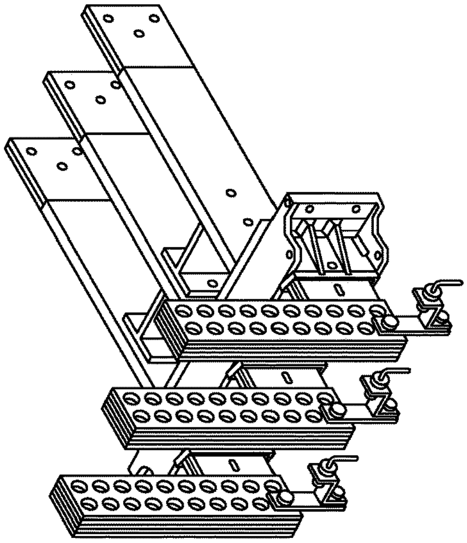
Figure 5A:
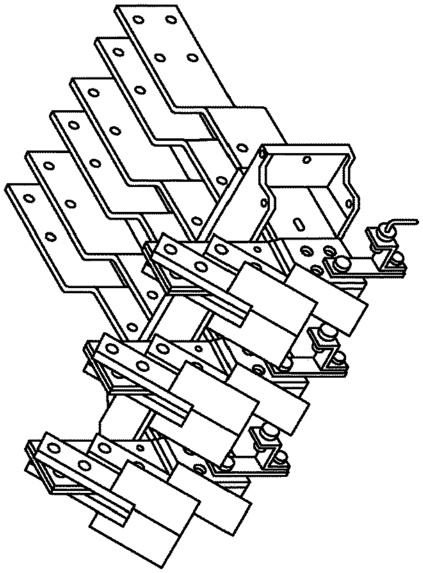

FIG. 3 is a diagram illustrating a side view of the mounting system and illustrates a distance D that is maintained between the sensor 106 and the busbar 103. Similarly, FIG. 4 illustrates an alternative view of the mounting system 100. FIGS. 5A through 5C illustrate various supporting assemblies that may be used for the mounting system 100 in accordance with some embodiments of the present inventive concept.

It will be understood that although certain embodiments illustrating certain orientations including elements of the system are shown in FIGS. 1 through 5C, embodiments of the present inventive concept are not limited to this configuration. Other configurations may be used without departing from the scope of the present inventive concept.

As discussed briefly above, embodiments of the present inventive concept provide an infrared sensor mounting system having a unique combination of highly emissive bus coating and insulated bracket to meet sensor UL1558 requirements for dielectric clearance and creepage. The design is applicable to multiple low-voltage switchgear variants with robust sensor correction factors. The design discussed herein is relatively easy and robust to install and may be very inexpensive to make, which may provide advantages over the conventional systems.

In the drawings and specification, there have been disclosed exemplary embodiments of the inventive concept. However, many variations and modifications can be made to these embodiments without substantially departing from the principles of the present inventive concept. Accordingly, although specific terms are used, they are used in a generic and descriptive sense only and not for purposes of limitation, the scope of the inventive concept being defined by the following claims.

What is claimed is:

1. A sensor mounting system, the system comprising:

a non-conductive bracket having a first end portion and a second end portion;

a busbar section connected to the first end portion of the non-conductive bracket and having a high emissivity coating on a surface thereof; and an infrared sensor connected to the second end portion of the non-conductive bracket, such that the infrared sensor faces the surface of the bus bar having the high emissivity coating and is spaced apart from the busbar section a predetermined distance.

2. The sensor mounting system of claim 1, wherein the non-conductive bracket comprises a "Z" shape.

3. The sensor mounting system of claim 2, wherein the non-conductive "Z" shaped bracket comprises a lip that prevents rotation of the bracket relative to the busbar section.

4. The sensor mounting system of claim 1, wherein the high emissivity coating is a black coating.

5. The sensor mounting system of claim 1, wherein the busbar section is connected to the first end portion of the non-conductive bracket by a bolt.

6. The sensor mounting system of claim 1, wherein the busbar section is mounted to a runback of a low voltage switchgear.

7. The sensor mounting system of claim 1, wherein the busbar section comprises one of copper or other electrically conductive material.

8. The sensor mounting system of claim 1, wherein an infrared projection from the infrared sensor extends downward from the second end portion of the non-conductive bracket.

9. A mounting system comprising:

a "Z" shaped non-conductive bracket having a first end portion and a second end portion; and a busbar section connected to the first end portion of the "Z" shaped non-conductive bracket and having a high emissivity coating on a surface thereof, wherein the second end portion of the "Z" shaped non-conductive bracket is configured to receive an infrared sensor at the second end portion of the "Z" shaped non-conductive bracket, such that the infrared sensor faces the surface of the bus bar having the high emissivity coating and is spaced apart from the busbar section a predetermined distance.

10. The mounting system of claim 9, wherein the non-conductive "Z" shaped bracket comprises a lip that prevents rotation of the bracket relative to the busbar section.

11. The mounting system of claim 9, wherein the high emissivity coating is a black coating.

12. The mounting system of claim 9, wherein the busbar section is connected to the first end portion of the non-conductive bracket by a bolt.

13. The mounting system of claim 9, wherein the busbar section is mounted to a runback of a low voltage switchgear.

14. The mounting system of claim 9, wherein the busbar section comprises one of copper or other electrically conductive material.

15. The sensor mounting system of claim 9, wherein an infrared projection from the infrared sensor extends downward from the second end portion of the "Z" shaped non-conductive bracket.

* * * * *